United States Patent [19]

Downing

[11] 4,194,313
[45] Mar. 25, 1980

[54] ARTICULATED PANEL DISPLAY

[75] Inventor: Jack G. Downing, Cincinnati, Ohio

[73] Assignee: Downing Displays, Inc., Cincinnati, Ohio

[21] Appl. No.: 916,934

[22] Filed: Jun. 19, 1978

[51] Int. Cl.² .......................... E04B 2/74; G09F 15/00
[52] U.S. Cl. ........................................ 40/610; 40/155; 40/606; 160/135
[58] Field of Search ...................... 40/155, 156, 152.1, 40/152, 154, 606, 607, 605, 610, 584; 52/631, 71, 658, 239; 160/135, 351, 231 A; 16/150, 129

[56] References Cited

U.S. PATENT DOCUMENTS

| | | | |
|---|---|---|---|
| 2,274,047 | 2/1942 | Derman | 160/135 X |
| 2,634,361 | 4/1953 | Reynolds | 40/152 X |
| 2,784,779 | 3/1957 | Knipfer et al. | 160/135 |
| 3,188,773 | 6/1965 | Schneller et al. | 52/658 X |
| 3,240,845 | 3/1966 | Voelker | 52/631 X |
| 3,841,042 | 10/1974 | Siegal | 52/239 |
| 4,090,335 | 5/1978 | Curatolo | 52/239 |
| 4,118,903 | 10/1978 | Coulthard | 52/239 X |

*Primary Examiner*—John F. Pitrelli
*Attorney, Agent, or Firm*—Melville, Strasser, Foster & Hoffman

[57] ABSTRACT

A collapsible panel display composed of a plurality of panels hingedly connected together along integral hinge forming bridges, the display being formed from a single length of honeycomb sheeting covered with a flexible facing material, such as a fabric adapted to be engaged by a Velcro type fastener, the hinge forming bridges being defined by sets of spaced apart score lines, the honeycomb sheeting being crushed to essentially flat condition in the areas of the score lines and only partially crushed in the areas between the sets of score lines, the hinge forming bridges being contoured to define oppositely directed arcuate surfaces, the panel display including locking elements adapted to engage adjoining panels to detachably secure them in fixed relation to each other.

3 Claims, 8 Drawing Figures

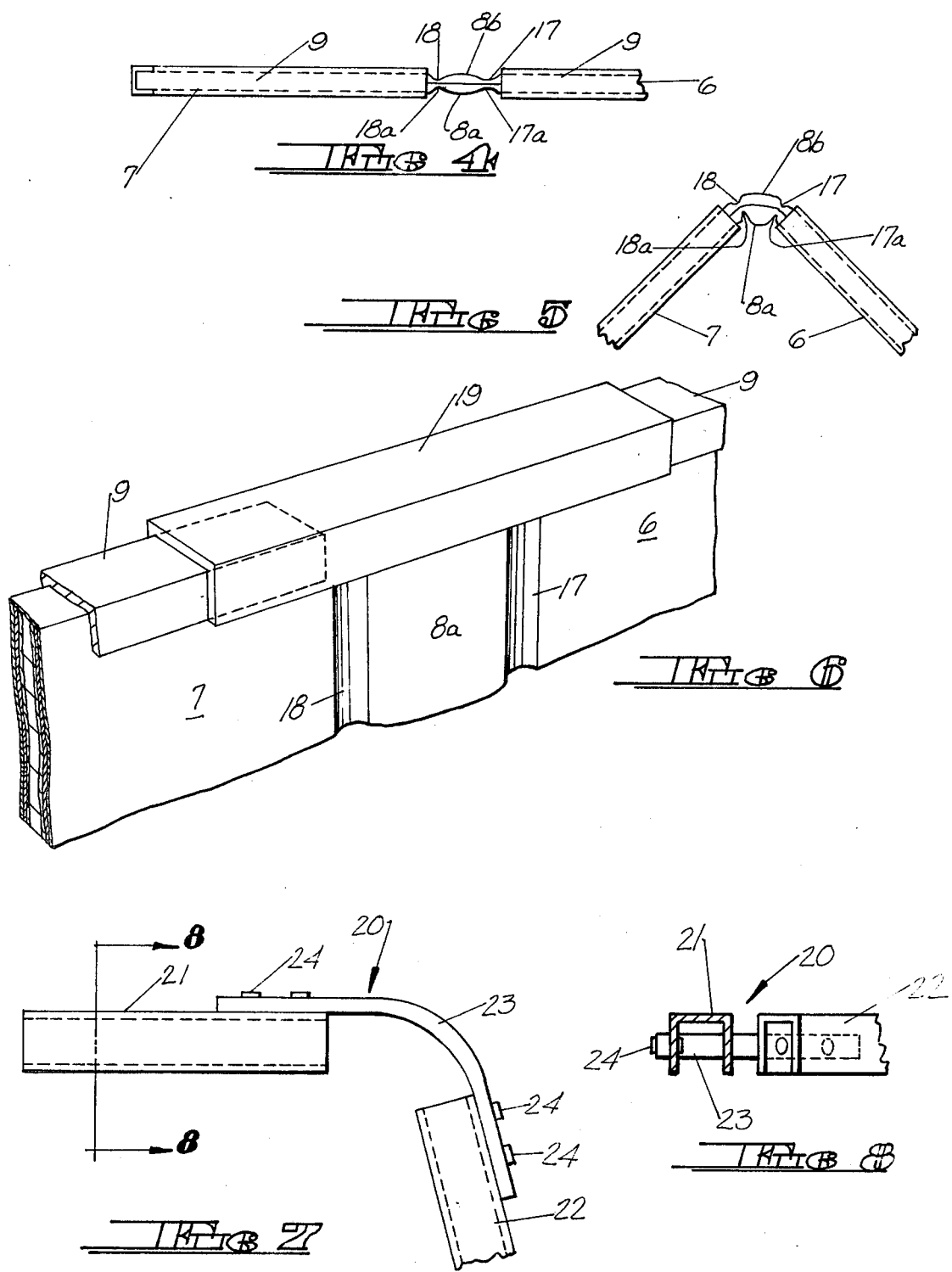

ARTICULATED PANEL DISPLAY

This invention relates to displays of the type used by exhibitors at trade shows, exhibitions and conventions to advertise and promote their goods or services.

BACKGROUND OF THE INVENTION

Collapsible displays have become increasingly popular with exhibitors due to the fact that they may be readily assembled and disassembled, and can be stored in shipping cases for transportation from one location to another. In general, such displays comprise a series of components, primarily in the form of panels, which when assembled form a display booth. Such displays come in various sizes ranging from so-called tabletop displays to floor supported displays which are of normal room height. By having a series of interconnected panels, the displays may take different shapes so as to accommodate the display to the space available or to the particular needs of the exhibitors.

A popular type of display currently in use comprises a series of modular panels formed from laminated sheet material, the panels being framed in aluminum, usually in the form of channel-shaped members which engage the edges of the panel forming sheet material. The panels are normally hinged together using conventional metal hinges. Many exhibitors have, however, objected to displays of this character in that the protective aluminum framing along the abutting side edges of adjacent panels interrupts the continuity of the display and its colorscheme by dividing the display into a series of discrete and readily discernable panels. While various efforts have hitherto been made to eliminate the metallic borders and conventional hinges, as by utilizing fabric or plastic hinges, these expedients have not been very successful due to the lack of stability of the hinge forming materials which, in turn, decrease the stability of the entire display. In many instances, the lack of firm support for the panels along the hinge lines result in warping or bowing of the panels, and in addition the resultant hinge lines are often unattractive and detract from the appearance of the display.

In contrast to the foregoing, the present invention provides a unique system of articulated display panels which effectively eliminates the difficulties experienced with prior art panel systems and at the same time provides an extremely attractive and versatile display.

SUMMARY OF THE INVENTION

In accordance with the present invention, a series of display panels is formed from a single length of panel forming material comprising a honeycomb core formed from kraft paper, the core being faced on both sides with paperboard stock. For convenience in description, the basic panel forming material will be described herein as honeycomb sheeting. Such honeycomb sheeting is commercially available and is normally treated with flame retardant chemicals and polymers to increase its fire resistance and strength. In addition, the facing panels may have a thin layer of aluminum foil laminated to their outer surfaces to further enhance the fire resistance and strength of the honeycomb sheeting. While light in weight, the sheeting is nonetheless rigid and not readily subject to warping or bowing.

In accordance with the invention, a continuous length of honeycomb sheeting of a size to form a series of articulated display panels is covered on both sides with a continuous length of facing material, preferably a fabric engagable by Velcro type fasteners, although other fabrics or plastic materials may be used, the facing material being securely laminated to the honeycomb sheeting by means of a suitable bonding adhesive. Preferably, the opposite sides of the honeycomb sheeting will be covered by a continuous length of facing material which bridges the edge of the honeycomb sheeting defining the uppermost edges of the panels being formed, thereby providing a finished upper edge.

Following the lamination of the facing material to the honeycomb sheeting, the panel forming material is then subjected to a scoring operation in which the panel forming material is scored from both sides to define a series of articulated panels hinged together in side-by-side relation. The panels are separated by spaced apart pairs of score lines which define hinge forming bridges in the areas between the pairs of score lines. The scoring of the panels is such that the honeycomb sheeting will be flattened to near its center line from both sides in the areas of the spaced apart score lines, and in addition the honeycomb sheeting will be compressed and partially crushed in the areas defining the hinge forming bridges, the bridge areas displaying a convex curvature on both sides of the panels. Such curvature is both decorative and functional, the curved bridge areas forming attractive yet unobtrusive hinges while at the same time providing strength and rigidity in the areas of the hinges. Such bridging areas readily lend themselves to folding in either direction and provide smoothly rounded edges when adjacent panels are folded relative to each other.

Following scoring, the top, bottom, and free side edges of the outermost panels are bordered with channel-shaped strips, preferably aluminum, the strips which extend along the top and bottom edges of the panels terminating short of the hinge forming bridges so that the panels are free to fold relative to each other. However, when it is desired to secure adjacent panels in a particular fixed relation relative to each other, channel-shaped locking elements are provided which clamp over and extend between the frame forming channels extending along the top edges of adjacent panels, the locking elements serving to effectively lock the adjoining panels together in their desired position of use. Where a series of adjoining panels is to extend in a straight line relative to each other, the locking elements comprise straight lengths of channel-shaped material; whereas if an adjoining pair of panels is to be angularly disposed relative to each other, the locking element is composed of a pair of channel-shaped locking members interconnected by a metal strap bent to the desired angle. To this end, the metal strap is preferably formed from an essentially dead-soft metal which may be repeatedly bent as desired and which, when bent to a particular angle, will retain that configuration until bent to a different angle. Consequently, the exhibitor may readily lock the panels in any desired position of use utilizing a minimal number of different locking members.

Accordingly, a principal object of the present invention is the provision of a display composed of a plurality of articulated panels provided with integral hinge forming bridges which are both decorative and functional.

A further object of the invention is the provision of an articulated panel display in which the hinges do not interfere with the continuity of the display, such as its color scheme, and at the same time the configuration of the hinge forming bridge areas provides an attractive adjunct to the panels together with strength and rigidity.

Still a further object of the invention is the provision of a panel display system incorporating locking elements which enable the exhibitor to secure the panels together in any desired positions of use, the securing elements themselves being unobtrusive and blending in to the channels which border the marginal edges of the system. The foregoing, together with other objects of the invention which will appear hereinafter or which will be apparent to the worker in the art upon reading this specification are accomplished by those constructions and arrangements of parts which will now be described in detail.

DESCRIPTION OF THE DRAWINGS

FIG. 4 is a view taken along the line 4—4 of FIG. 3 illustrating the contour of the hinge forming bridge areas lying between adjacent panels.

FIG. 5 is a fragmentary plan view similar to FIG. 4 illustrating the bridge forming hinge in folded condition.

FIG. 6 is an enlarged fragmentary perspective view illustrating a locking element for securing a pair of adjoining panels in straight line relationship to each other.

FIG. 7 is an enlarged fragmentary plan view illustrating a locking element for securing a pair of adjoining panels in angular relationship to each other.

FIG. 8 is a sectional view of the locking element of FIG. 7 taken along the line 8—8 of FIG. 7.

DESCRIPTION OF THE PREFERRED EMBODIMENTS

Figure 1:
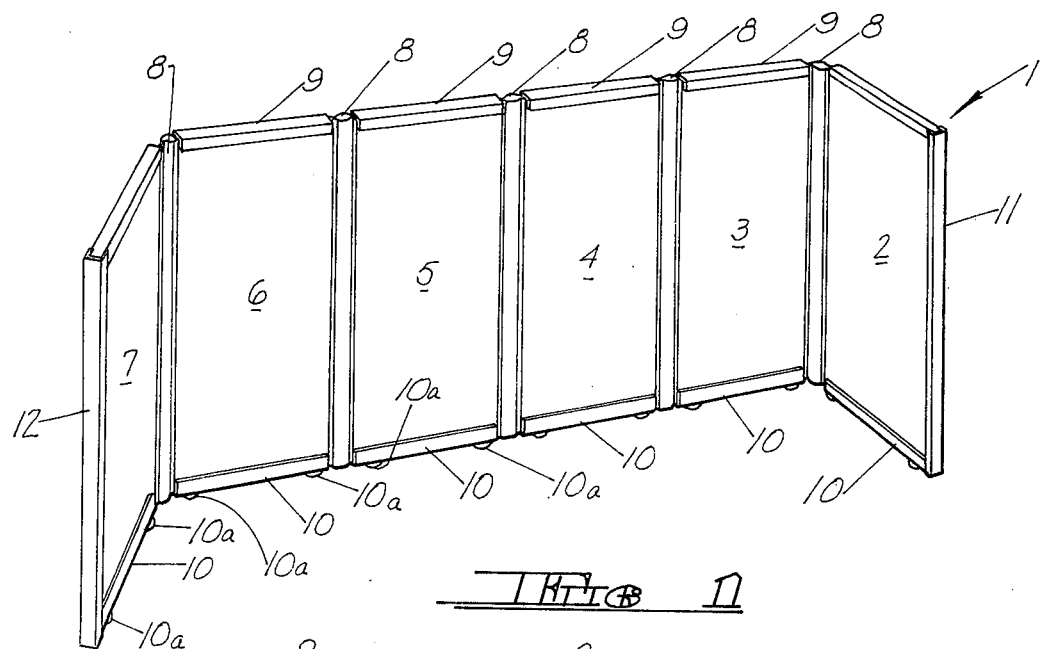
FIG. 1 is a perspective view of an articulated panel display in accordance with the invention, the display being in erected condition.

Referring first to FIG. 1 of the drawings, an articulated panel display is indicated generally at 1, the display in this instance comprising a series of panels 2, 3, 4, 5, 6 and 7 hingedly connected together along their adjoining side edges by means of integral hinge forming bridges 8. While in the display illustrated there are six articulated panels, the number of panels may be varied as desired, as may the height and width of the panels, depending upon whether the display is for tabletop or floor usage. It is also within the spirit of the invention to provide upper and lower sections adapted to be connected together by fastener means of known character, thereby permitting storage and shipment of the panels in convenient length for handling. The top and bottom edges of the panels are provided with borders 9 and 10, respectively, preferably in the form of channel-shaped aluminum edging, which serves both to mask and protect the edges of the panels as well as strengthen the exposed edges. The free side edges of the outermost panels 2 and 7 are also provided with channel-shaped borders 11 and 12, respectively, which protect and reinforce the exposed side edges of the panel display. While aluminum channels are preferred, the channel-shaped borders may be formed from other materials, such as extruded plastic. It will be understood, of course, that the border forming channels will be of a size to snuggly fit over the edges of the sheeting, and they are preferably secured in place by means of adhesive, although rivet-like fasteners or other fastening means may be employed, if desired. It is also preferred to provide feet 10a along the bottom edges of the panels, the feet being in the form of rubber or plastic buttons secured to the undersurfaces of the channel-shaped edge forming members 10.

Figure 2:
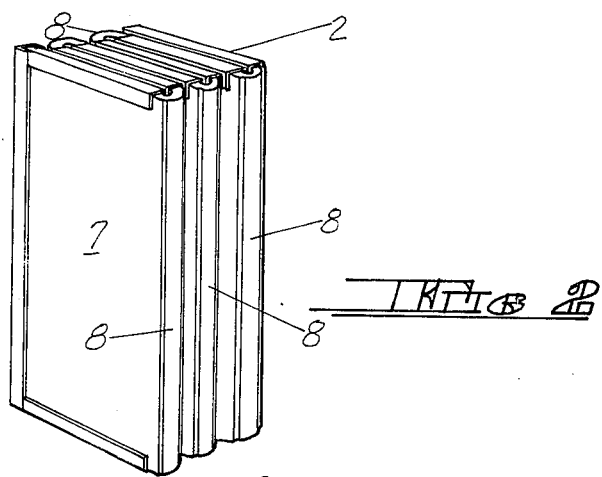
FIG. 2 is a perspective view illustrating the panel display of FIG. 1 in folded condition for storage or shipment.

As illustrated in FIG. 1, the panels are in erected condition in which they form a display, the outermost panels 2 and 7 being inclined with respect to the adjoining panels 3 and 6, respectively, whereas the panels 3, 4, 5 and 6 are arranged in a straight line. This arrangement is exemplary only since the panels may be arranged in any desired angular relationship with respect to each other, or they may be arranged in semicircular or even circular fashion, depending upon the desired configuration of the display. It will be understood that the display may include additional components, such as headers, lighting fixtures, copy signs, shelving and the like, which as such do not form a part of the present invention. For shipping and storage purposes, the panels may be folded relative to each other to form a flat-folded compact unit, the folded condition of the display being illustrated in FIG. 2.

Figure 3:
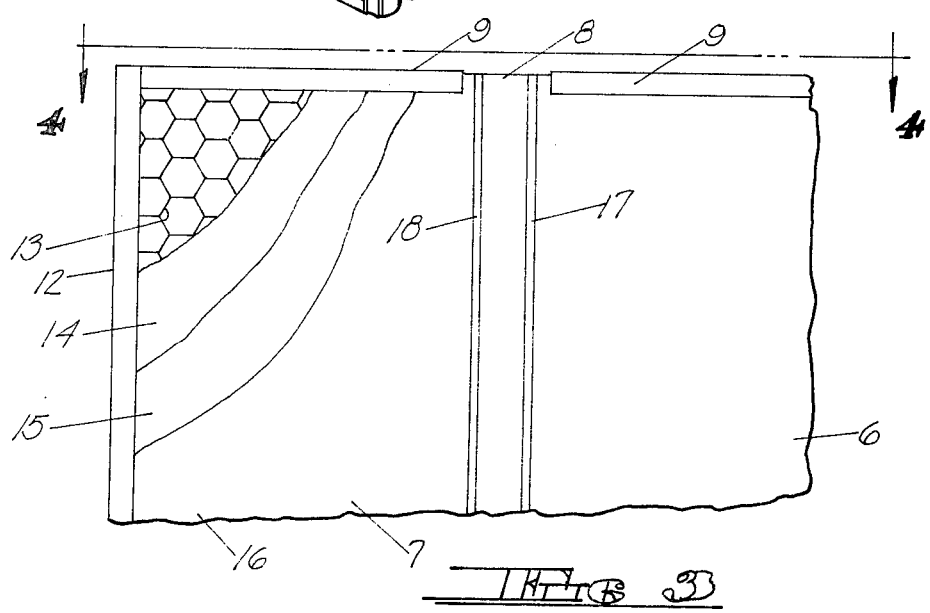
FIG. 3 is an enlarged fragmentary front elevational view with parts broken away illustrating the construction of the display.

In accordance with the invention, the panel display is formed from a continuous length of panel forming material of the desired size; that is, the panels 2, 3, 4, 5, 6, and 7 initially comprise a unitary sheet of laminated stock which is scored to define the various panels and their interconnecting bridge forming hinges as an incident of the fabrication of the panel display. The base material from which the panel display is fabricated comprises honeycomb sheeting composed of a honeycomb core, indicated at 13 in FIG. 3, which is faced on both sides with facing sheets, one of which is indicated at 14, the facing sheets being formed from paperboard or boxboard with the end edges of the honeycomb cells bonded to the inner surfaces of the facing sheets. While the thickness of the honeycomb sheeting does not constitute a limitation on the invention, thicknesses of approximately $\frac{3}{8}$ to $\frac{1}{2}$ inch have been found particularly suited for display panel use. Preferably the honeycomb core and the facing sheets will be chemically treated to render them fire retardant, and polymers also may be used to enhance the strength of the honeycomb sheeting. In addition, it is preferred to use honeycomb sheeting having a thin layer of aluminum foil, indicated at 15 in FIG. 3, laminated to the outer surfaces of the facing sheets 14, the foil serving to enhance the fire retarding properties of the sheeting as well as provide a moisture barrier.

The honeycomb sheeting is covered on both sides with a facing material 16, preferably a fabric capable of being engaged by a Velcro type fastener, having a multiplicity of tiny fabric engaging hooks, thereby facilitating the attachment of display materials, lighting fixtures and the like equipped with Velcro type fasteners. Other types of fabrics and plastic facing materials may be utilized, depending upon the desired surface finish for the panels. Interesting decorative effects can be achieved by combining fabrics of different colors and/or textures. It is preferred, however, that the fabric bridges at least the edge of the honeycomb sheeting which defines the upper edges of the panel display being formed. If, for example, a single color fabric is to be utilized, it is preferred that the fabric be of a size such that a continuous length of the fabric will cover both sides of the honeycomb sheeting. In instances where different fabrics are utilized, it is preferred that the fabrics are arranged so that a continuous length of fabric will bridge the edge of the honeycomb sheeting which forms the uppermost edges of the panels, thereby providing a neatly finished edge in the areas of the bridge forming hinges 8. If desired, both the upper and lower edges of the panels may be bridged by the fabric, or the edges of the material may be tucked into the edges of the honeycomb sheeting to form finished edges. The facing material preferably will be adhesively secured to the facing sheets 14 by the use of any suitable adhesive material. While a water base adhesive is preferred, either heat activated or pressure sensitive adhesive may be used.

Following lamination of the facing material to the honeycomb sheeting, the material is next subjected to a scoring operation to define the hinge forming bridges 8, the scoring being carried out by sets of scoring rules positioned to contact the opposite sides of the laminated sheeting. The scoring rules are configured to define spaced apart sets of mating score lines 17, 17a and 18, 18a which define the adjacent side edges of an adjoining pair of panels, such as the panels 6 and 7 seen in FIG. 4, the area lying between the score lines 17, 17a and 18, 18a defining the hinge forming bridges, the opposite sides of which are designated 8a and 8b. Preferably the width of the bridge areas 8a and 8b will be greater than the thickness of the surfaced honeycomb sheeting but not substantially greater than twice the thickness thereof, the objective being to have the hinge forming bridges form neatly rounded edges when the panels are folded. As will be apparent from FIG. 4, the sheeting is crushed and flattened in the areas of the mating score lines to near the center line of the honeycomb sheeting. The bridge forming areas 8a and 8b lying between the pairs of score lines 17, 18 and 17a, 18a are not completely flattened; rather, the sheeting is only partially crushed, the scoring rules being configured to provide a convex or rounded curvature to the bridge areas 8a and 8b when viewed in cross-section. By reason of this configuration, the hinge forming bridges are reinforced and strengthened and yet the adjoining panels are free to fold in either direction. When adjoining panels are folded relative to each other, as illustrated in FIG. 5, the score lines 17 and 18 on the outside of the fold tend to flatten and disappear, the curved portion 8b defining an essentially smooth rounded edge. On the inside of the fold, the panels 6 and 7 effectively pivot about their respective score lines 17a and 18a, and the curved portion 8a retains its bead-like configuration. Thus, due to the internal reinforcement of the hinge forming bridges provided by the honeycomb sheeting, the hinge areas maintain their integrity and their strength and rigidity contribute to the overall stability of the display.

While the panels making up the display may be arranged in any desired angular configuration with respect to each other, once the display has been erected it is desirable to secure the panels against accidental displacement. To this end, the panel display system of the present invention utilizes locking elements which may be readily attached to the uppermost edges of the panels, the locking elements being in the form of channel-shaped members of a size to snuggly fit over the channel members forming a border for the uppermost edges of the panels. By making the locking elements correspond in depth to the border forming channels and of the same material or color, they blend into the borders and are barely discernable.

Where adjoining channels are to be joined together in a straight line, the locking element may comprise a straight length of channel-shaped aluminum or the like, as indicated at 19 in FIG. 6, the locking element being of a length to span the hinge forming bridge 8, with its opposite end edges engaging about the end edges of the border channels 9. When the locking element 19 is in place, it will be evident that the panels 6 and 7 cannot be folded relative to each other and hence will retain their straight line relationship.

Where adjoining panels are angularly disposed with respect to each other, the locking element 20 illustrated in FIGS. 7 and 8 is used. This element has a pair of channel-shaped members 21 and 22 each of a size to clamp against the border forming channel members 9. The two members are interconnected by a metallic strap 23 having its opposite ends secured to the members 21 and 22, as by means of rivets 24. By bending the strap 23, the channels 21 and 22 may be disposed at any desired angle with respect to each other, and when the locking element is clamped to the upper edges of an adjoining pair of panels, the panels will be secured at the angle established by the locking element. Preferably the strap 23 will be formed from an essentially dead-soft metal so that the locking elements may be readily bent by the exhibitor to any desired angle, thereby enabling the exhibitor to lock the panels in any selected configuration. Of course, the straps 23 may be permanently set in a given bent condition so as to establish a fixed angle between the channel members 21 and 22.

As should now be apparent, the present invention provides an improved articulated panel display having integral hinges which are both functional and decorative, the panel system including locking elements by means of which the panels may be secured in any desired positions of use relative to each other. It will be understood that modifications may be made in the invention without departing from its spirit and purpose, the invention being limited only in the manner set forth in the claims which follow.

The embodiments of the invention in which an exclusive property or privilege is claimed are defined as follows:

1. An articulated panel display comprising a plurality of panels hingedly connected together in side-by-side relation, said display being formed from a single length of honeycomb sheeting covered on its opposite surfaces with a flexible facing material, the opposite surfaces of the covered honeycomb sheeting being scored by spaced apart mating pairs of score lines, the areas between adjacent pairs of the score lines defining panel sections and the areas between the score lines in each air defining integral hinge forming bridges interconnecting the panel sections, the hinge forming bridges having a width greater than the thickness of the honeycomb sheeting but not substantially greater than twice the thickness of said honeycomb sheeting, the honeycomb sheeting being crushed to essentially flat condition in the areas of the score lines and partially crushed in the areas of the hinge forming bridges, the hinge forming bridge areas being contoured to define back-to-back outwardly facing essentially arcuate surfaces, whereby the hinge forming bridges will form neatly rounded edges when adjoining panel sections are folded in relation to each other in either direction.

2. The articulated panel display claimed in claim 1 wherein channel-shaped protective members are secured to the top and bottom edges of each panel section and to the free side edges of the outermost panel sections, said top and bottom channel-shaped protectve members terminating short of said hinge forming bridge areas.

3. The articulated panel display claimed in claim 1 wherein said honeycomb sheeting is covered with a fabric capable of being engaged by Velcro type fasteners.

* * * * *